US012789335B2

(12) United States Patent
Wood et al.

(10) Patent No.: US 12,789,335 B2
(45) Date of Patent: Nov. 10, 2026

(54) UTILITY PROBE WITH RESILIENT FINGERS

(71) Applicant: Utility Solutions, Inc., Hickory, NC (US)

(72) Inventors: Eugene H. Wood, Hickory, NC (US); Thomas Beane, Hudson, NC (US)

(73) Assignee: Utility Solutions, Inc., Hickory, NC (US)

( * ) Notice: Subject to any disclaimer, the term of this patent is extended or adjusted under 35 U.S.C. 154(b) by 2 days.

(21) Appl. No.: 19/233,164

(22) Filed: Jun. 10, 2025

(65) Prior Publication Data

US 2025/0303538 A1 Oct. 2, 2025

Related U.S. Application Data

(63) Continuation of application No. 18/305,562, filed on Apr. 24, 2023, now Pat. No. 12,343,849.

(60) Provisional application No. 63/333,687, filed on Apr. 22, 2022.

(51) Int. Cl.
*B25B 27/14* (2006.01)
*B25G 1/04* (2006.01)
*H01H 69/02* (2006.01)

(52) U.S. Cl.
CPC ................ *B25B 27/14* (2013.01); *B25G 1/04* (2013.01); *H01H 69/02* (2013.01)

(58) Field of Classification Search
CPC .... A46B 3/08; A46B 3/10; A46B 3/12; A46B 3/14; B24D 13/00; B24D 13/10; B25B 27/14; B25G 1/04; H01H 69/02
USPC ........................................................ 267/47
See application file for complete search history.

(56) References Cited

U.S. PATENT DOCUMENTS

| | | | |
|---|---|---|---|
| 317,979 | A | 5/1885 | Danby |
| 347,837 | A | 8/1886 | Standiford |
| RE20,737 | E | 5/1938 | Kehl |
| 2,194,831 | A | 3/1940 | Marshall |
| 2,720,410 | A | 10/1955 | Smith |
| 2,890,313 | A | 6/1959 | Smith, Jr. |
| 2,918,556 | A | 12/1959 | Mikos |
| 2,922,864 | A | 1/1960 | Lindell |
| 3,032,630 | A | 5/1962 | McCloud et al. |
| 3,090,853 | A | 5/1963 | Mcdonald |
| 4,326,316 | A | 4/1982 | Dolenti |
| 5,269,104 | A | 12/1993 | Dibiagio |
| 5,300,912 | A | 4/1994 | Tillery et al. |
| 5,406,669 | A | 4/1995 | Lesiw |
| 5,650,602 | A | 7/1997 | Wood |
| 6,093,901 | A | 7/2000 | Taylor |
| 6,453,776 | B1 | 9/2002 | Beattie |
| 6,474,197 | B1 | 11/2002 | Brown |
| 6,512,442 | B1 | 1/2003 | Taylor |
| 6,965,088 | B2 | 11/2005 | Franklin |

(Continued)

*Primary Examiner* — Jason L Vaughan
(74) *Attorney, Agent, or Firm* — Shumaker, Loop & Kendrick, LLP; Brandon C. Trego

(57) ABSTRACT

A utility probe is disclosed. The utility probed includes a body having an upper portion with first and second opposing ends and a lower portion extending from the upper portion; a shaft extending outwardly from the first end of the upper portion, the shaft including a plurality of holes therein; and an array of resilient fingers extending from the shaft, wherein each of the plurality of holes is configured to receive a respective one of the array of resilient fingers therein.

19 Claims, 11 Drawing Sheets

(56) References Cited

U.S. PATENT DOCUMENTS

| | | | | |
|---|---|---|---|---|
| 7,181,995 | B2 | 2/2007 | Rider | |
| 7,909,376 | B1 | 3/2011 | Mckinley | |
| 10,415,826 | B2 * | 9/2019 | Pedersen | F23J 3/026 |
| 12,186,883 | B2 * | 1/2025 | Cobián-Méndez | A47L 13/38 |
| 2005/0127040 | A1 | 6/2005 | Franklin | |
| 2009/0276973 | A1 | 11/2009 | Bouix | |
| 2013/0033052 | A1 | 2/2013 | Stinson | |
| 2023/0009698 | A1 | 1/2023 | Shirilla | |

* cited by examiner

UTILITY PROBE WITH RESILIENT FINGERS

BACKGROUND OF THE INVENTION

This invention relates generally to electrical utility tools, and more particularly to a probe for use by utility workers.

Circuit isolating devices such as fuse cutouts are adapted to be periodically opened to provide necessary service, such as for fuse replacement or service to electric power lines. Conventionally, such circuit isolating devices include a fuse assembly which can be serviced by removing a fuse barrel from the cutout and lowering it to the ground, carrying out service (e.g., by replacing an internal fuse wire) and replacing the barrel in the cutout. To do this, the fuse barrel is engaged with a probe tool having a narrow shaft.

One problem with existing probes is that the fuse barrel is not securely engaged with the probe. The fuse barrel can fall off the probe, endangering workers on the ground.

BRIEF SUMMARY OF THE INVENTION

This problem is addressed by a utility probe incorporating flexible fingers.

According to one aspect of the invention, an electric utility probe configured to engage an electrical component having an eye includes a body having an upper portion with first and second opposing ends and a lower portion extending from the upper portion; a shaft extending outwardly from the first end of the upper portion, the shaft including a plurality of holes therein; and an array of resilient fingers extending from the shaft, wherein each of the plurality of holes is configured to receive a respective one of the array of resilient fingers therein.

According to another aspect of the invention, an electrical utility probe configured to mount to an end of a line pole includes a body having an upper portion with first and second opposing ends and a lower portion extending from the upper portion, the lower portion including a pole mount to mount the body to a line pole; a hollow shaft extending outwardly from the first end of the body, parallel to an axis extending through the first and second opposing ends, the hollow shaft including a plurality of holes therein; and an array of resilient fingers secured to the shaft, the resilient fingers being arranged in a series of rows and extend radially outwardly from the shaft, wherein each of the plurality of holes is configured to receive a respective one of the array of resilient fingers therein.

According to another aspect of the invention, an electrical utility probe configured to engage an electrical component having an eye includes a body having an upper portion with first and second opposing ends and a lower portion adapted to mount the body to a line pole; a shaft extending outwardly from the first end, the shaft including a plurality of holes therein and a head disposed at a distal end thereof; and an array of resilient fingers secured to the shaft, wherein each of the resilient fingers are secured in a respective one of the plurality of holes and extend radially outwardly from the shaft.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
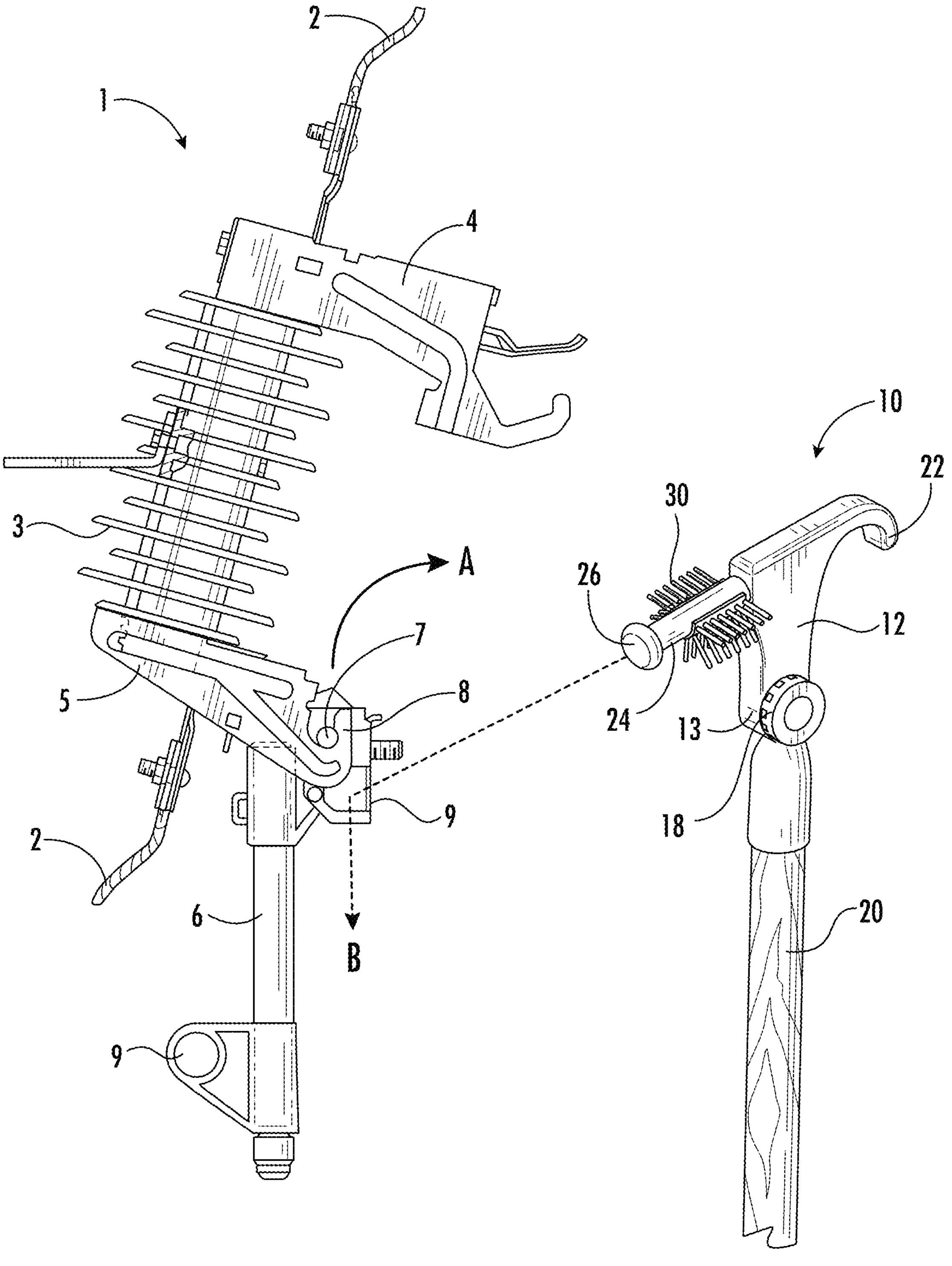
FIG. 1 is a perspective view of an exemplary probe, in conjunction with a prior art circuit isolating device.

Referring now to the figures, FIG. 1 illustrates a conventional electrical cutout 1 connected to high voltage power lines or electrical cables 2. The electrical cutout 1 has an insulator 3 which is arranged to be mounted on a utility pole cross arm or the like, an upper terminal assembly 4, a lower terminal assembly 5, and a fuse barrel 6.

The fuse barrel 6 includes trunnions 7 at its lower end received in hooks 8 of the lower terminal assembly 5. The fuse barrel 6 is pivotable about the trunnions 7 between two positions: (a) an open or separated position, seen in FIG. 1, in which there is an open circuit (i.e., no electrical continuity) between the upper and lower terminal assemblies 4, 5, and (b) a closed or connected position in which its upper end is engaged with the upper terminal assembly 4.

In the separated position, the fuse barrel 6 can be removed from the lower terminal for the purpose of repair or replacement. This is accomplished by engaging the fuse assembly with a suitable tool and lifting it out of the hooks 8 in the direction of the arrow "A" in FIG. 1.

Figure 2:
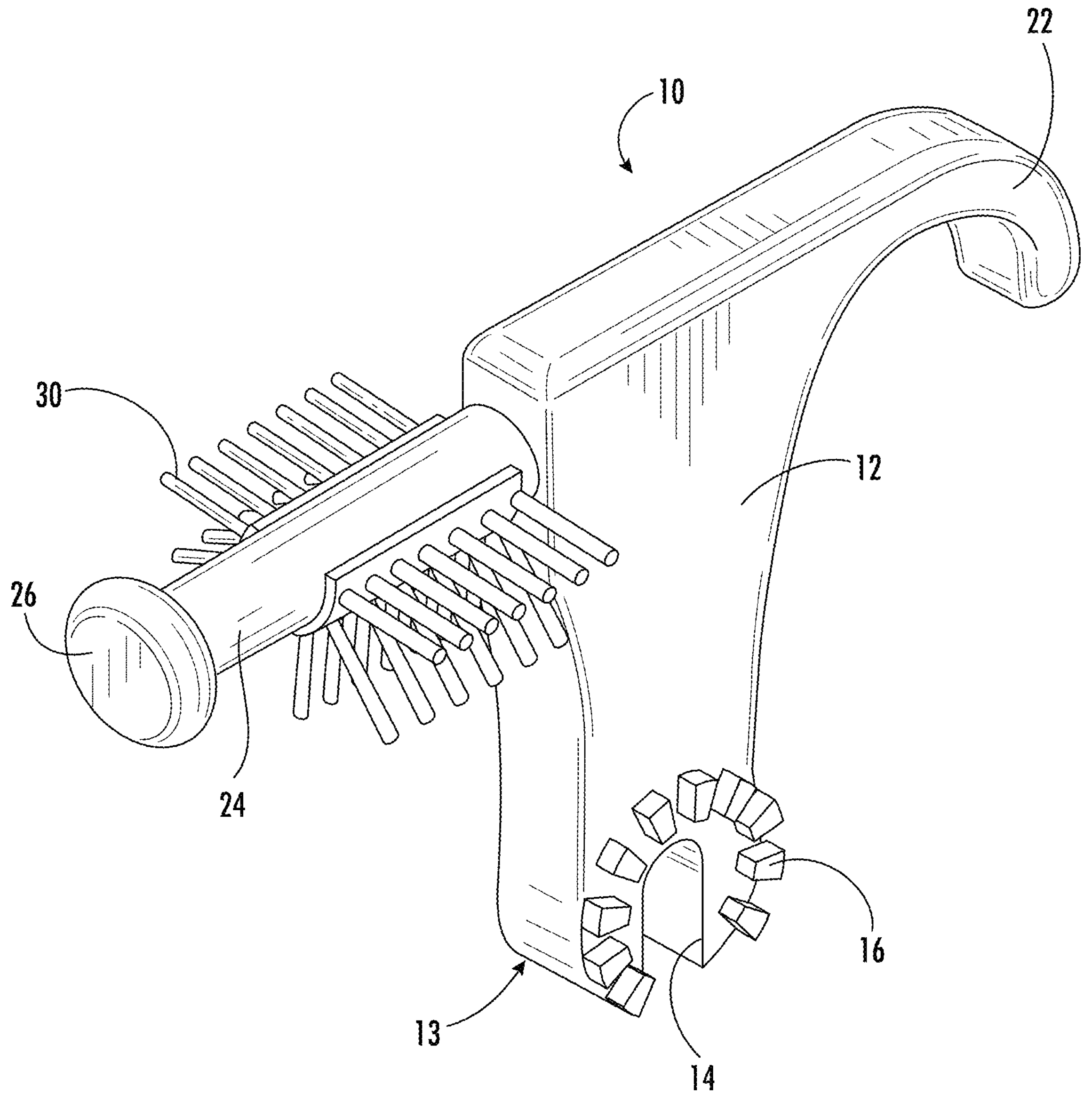
FIG. 2 is a perspective view of the probe of FIG. 1.
Figure 3:
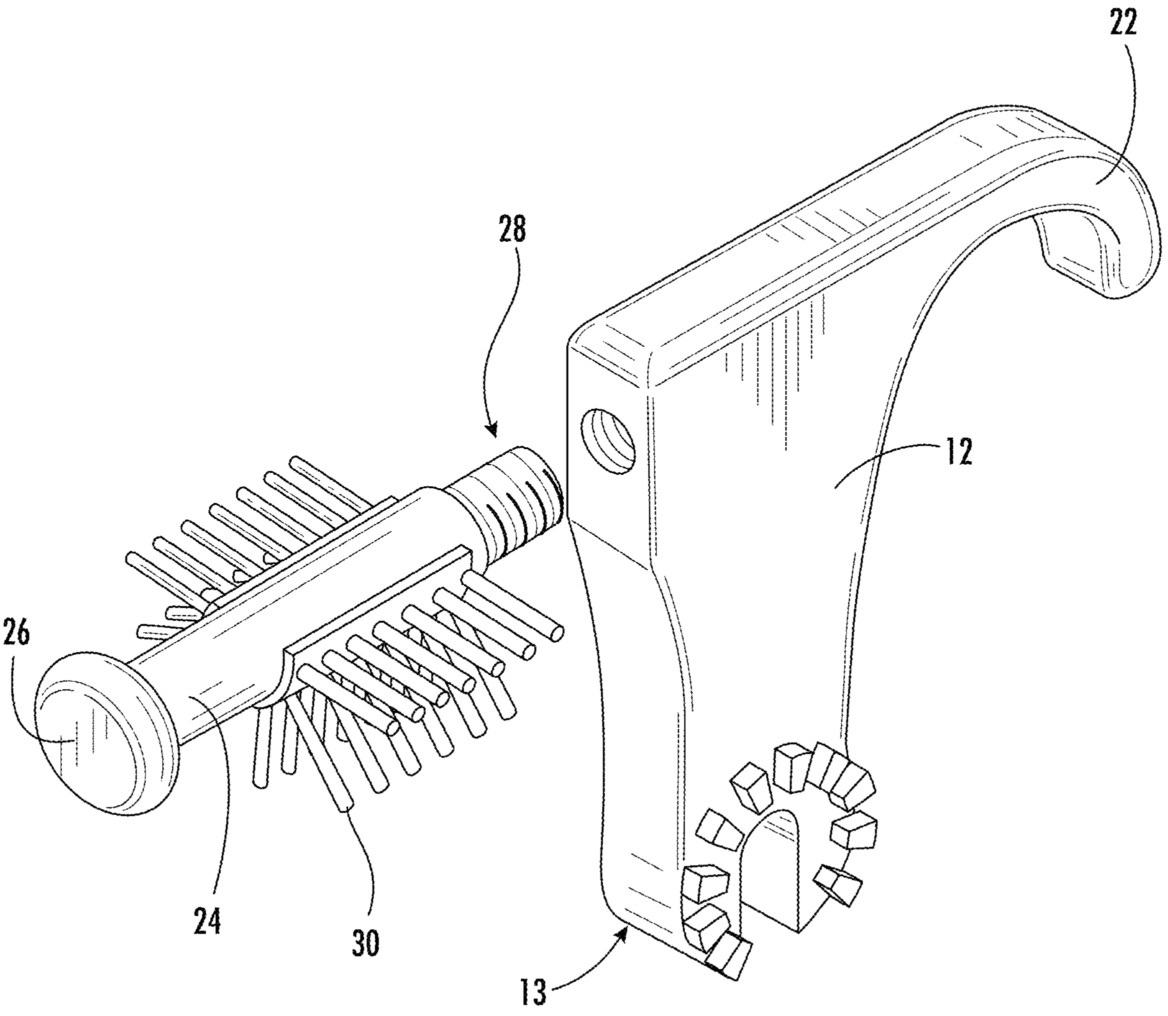
FIG. 3 is an exploded view of the probe of FIG. 1.

FIGS. 1 and 2 illustrate an exemplary probe 10 for use in handling a fuse barrel 6. It should be appreciated that the probe 10 may be used with cutouts, switches, or any electrical or non-electrical component with an eye for receiving the probe 10, such as a removable fuse, door, conductor bar, etc. The probe 10 includes a unitary body 12 with a pole mount 13 at its lower end, such as a slot 14 surrounded by splines 16 configured to engage complementary splines 18 of a line pole or "hot stick" 20. Referring to FIG. 2, at its upper end, the body 12 includes a hook 22. Opposite the hook 22, a probe shaft 24 extends from the body 12. A disk-like head 26 is disposed at the distal end of the shaft 24. In the illustrated example, the shaft 24 is a separate component mounted to the body by a threaded connection 28 (FIG. 3).

Figure 4:
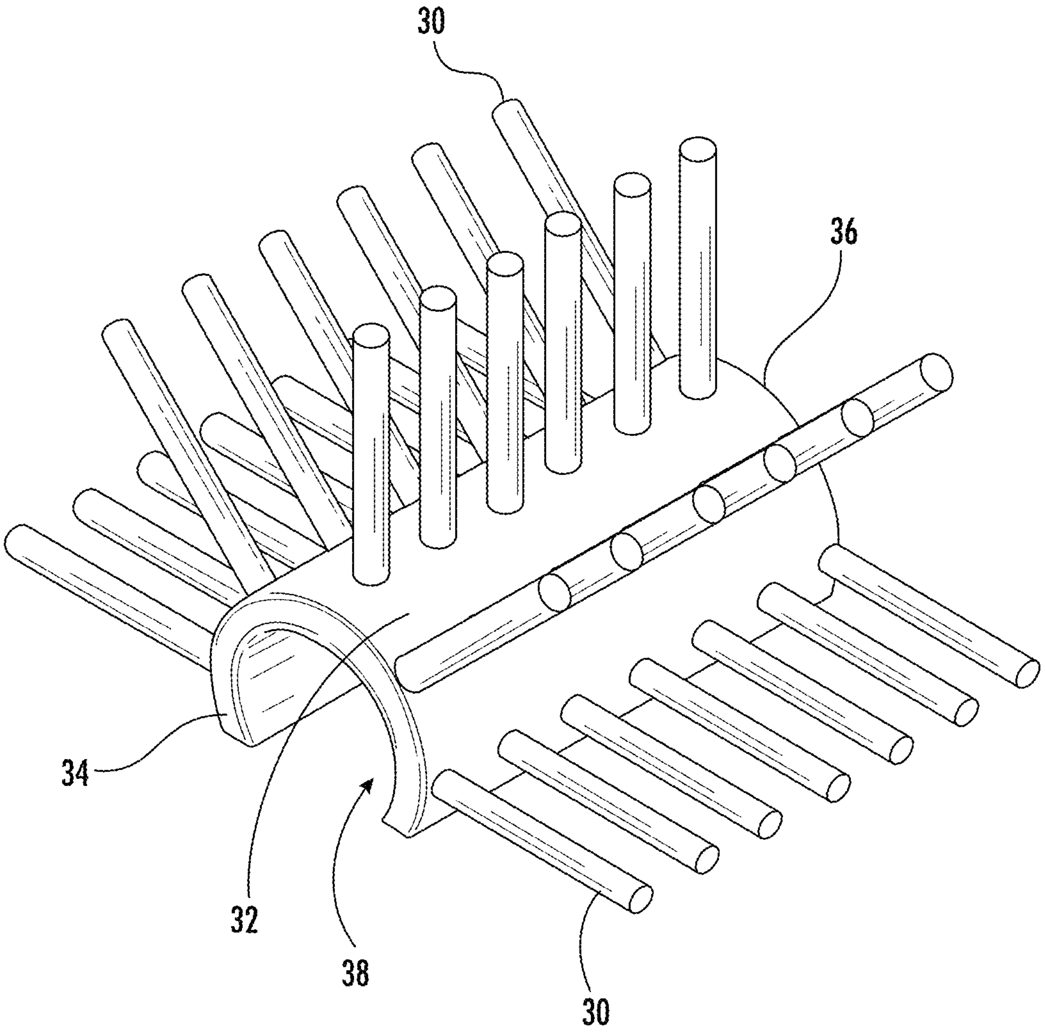
FIG. 4 is a perspective view of a finger assembly of the probe of FIG. 1.
Figure 5:
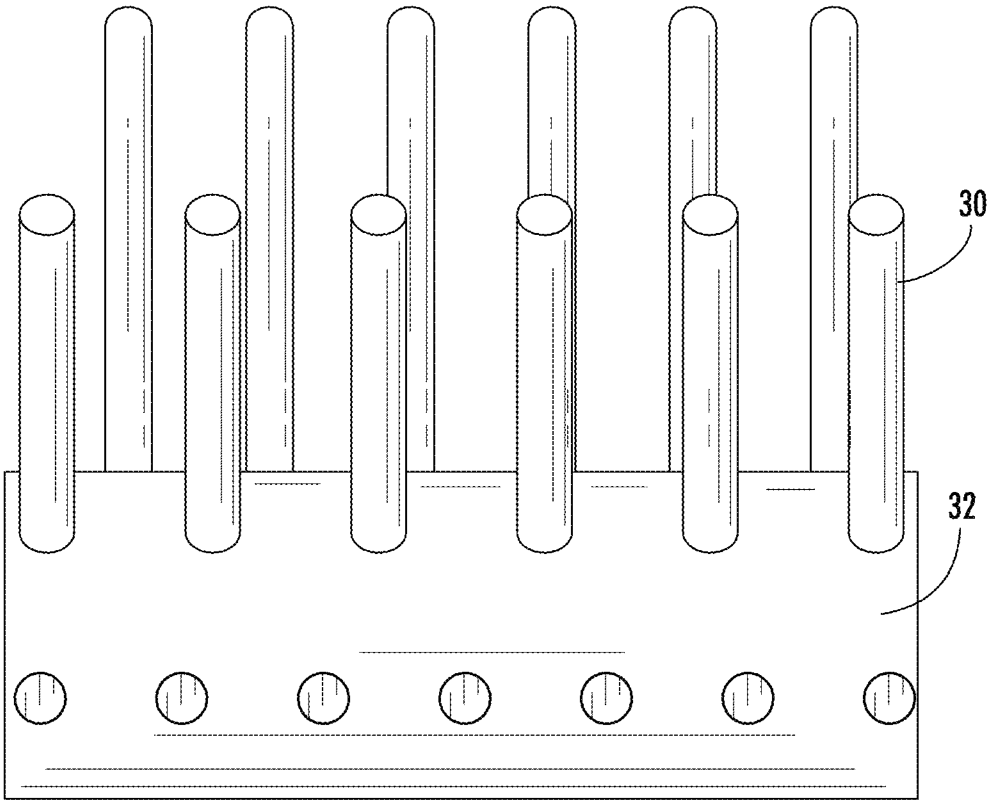
FIG. 5 is a side elevation view of the finger assembly of FIG. 4.
Figure 6:
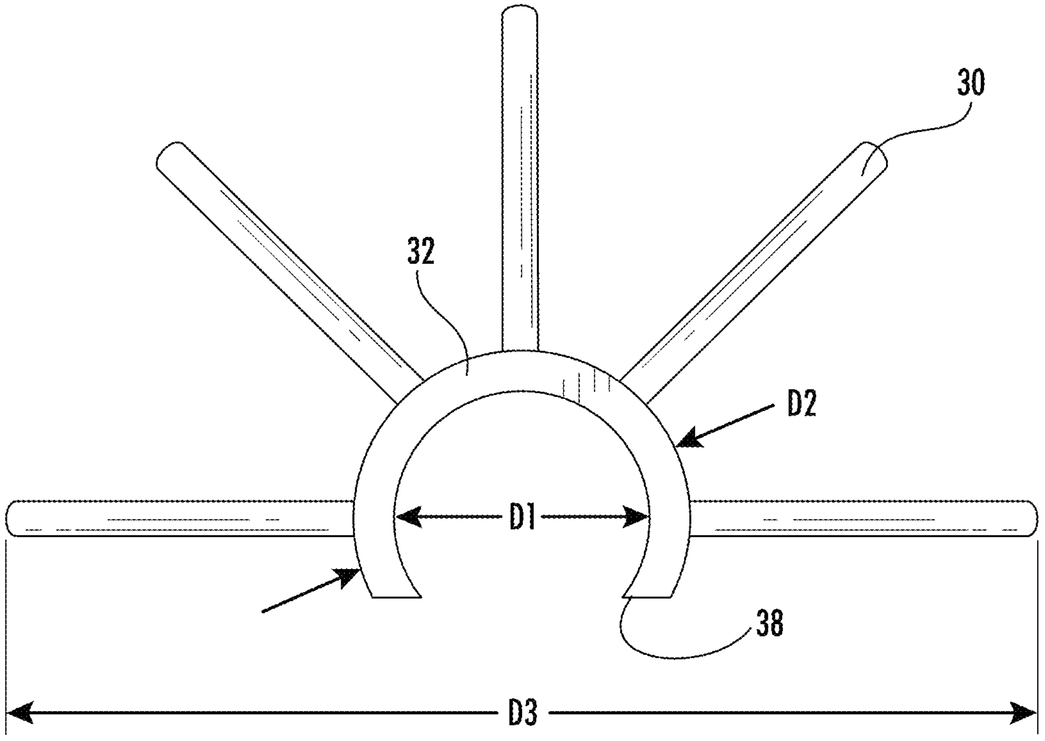
FIG. 6 is an end view of the finger assembly of FIG. 4.
Figure 7:
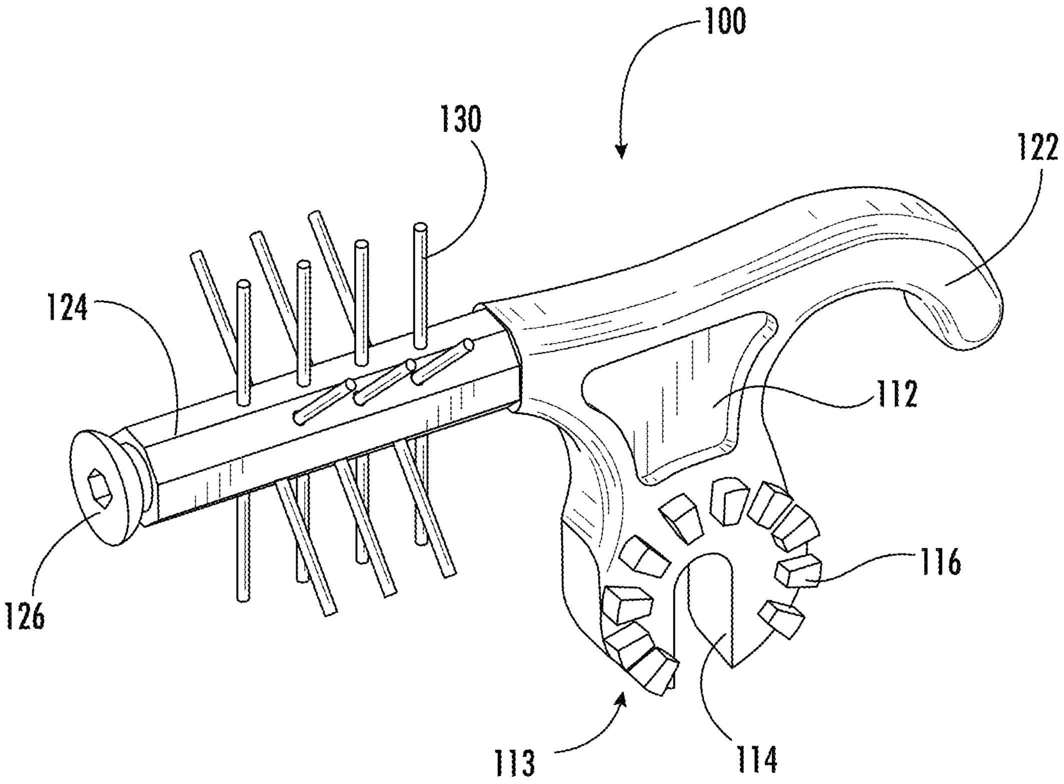
FIG. 7 is a perspective view of an alternative embodiment of a probe.
Figure 8:
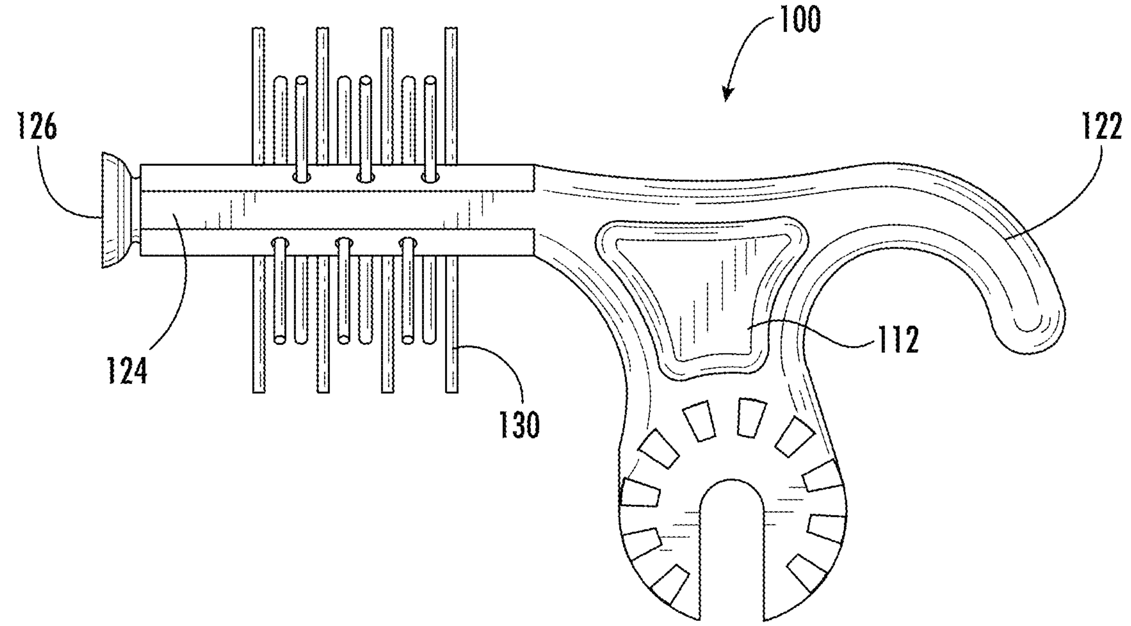
FIG. 8 is a side elevation view of the probe of FIG. 7.

An array of resilient fingers 30 extends from the shaft 24. In the illustrated example (FIGS. 4-6), the fingers 30 are integrally formed with a sleeve 32 that fits over the shaft 24. The sleeve 32 is of a generally cylindrical form extending between a first end 34 and a second end 36. It has a wall defining an inside diameter D1 and an outside diameter D2. In the illustrated example, the cylindrical shape is interrupted by a longitudinal slot 38. The slot 38 is sized to permit the sleeve 32 to snap over the shaft 24. The sleeve 32 may be retained entirely by friction and/or tension, or it may be secured with adhesive or fasteners (not shown).

The fingers 30 are arranged in a series of rows extending radially outward from the sleeve 32. The fingers 30 have an outside diameter D3 which is selected to be larger than a diameter of an opening 9 (see FIG. 1) of the fuse barrel 6.

The fingers 30 may be made of any material having suitable strength and resiliency, for example, natural or synthetic rubber, plastic, with or without a filler such as reinforcing fibers. They may be molded as one piece with the sleeve 32. The fingers 30 and the sleeve 32 may be provided as single unit which is replaceable when worn.

Different structures may be used to mount the resilient fingers to a probe. FIGS. 7-10 illustrate an alternative probe 100 for use in handling a fuse barrel 6. The probe 100 includes a unitary body 112 with a pole mount 113 at its lower end, such as a slot 114 surrounded by splines 116. At its upper end, the body 112 includes a hook 122. Opposite the hook 122, a probe shaft 124 extends from the body 112. A disk-like head 126 is disposed at the distal end of the shaft 124.

The probe shaft 124 is hollow and includes a plurality of holes 125. A plurality of resilient fingers 130 are mounted to the probe shaft 124. Each finger 130 has an inner end 131 and an outer end 133. The fingers 130 may be made of any material having suitable strength and resiliency, for example, natural or synthetic rubber, plastic, with or without a filler such as reinforcing fibers, or from a metal alloy. For example, they may comprise stranded metal wires (coated or uncoated).

Figure 9:
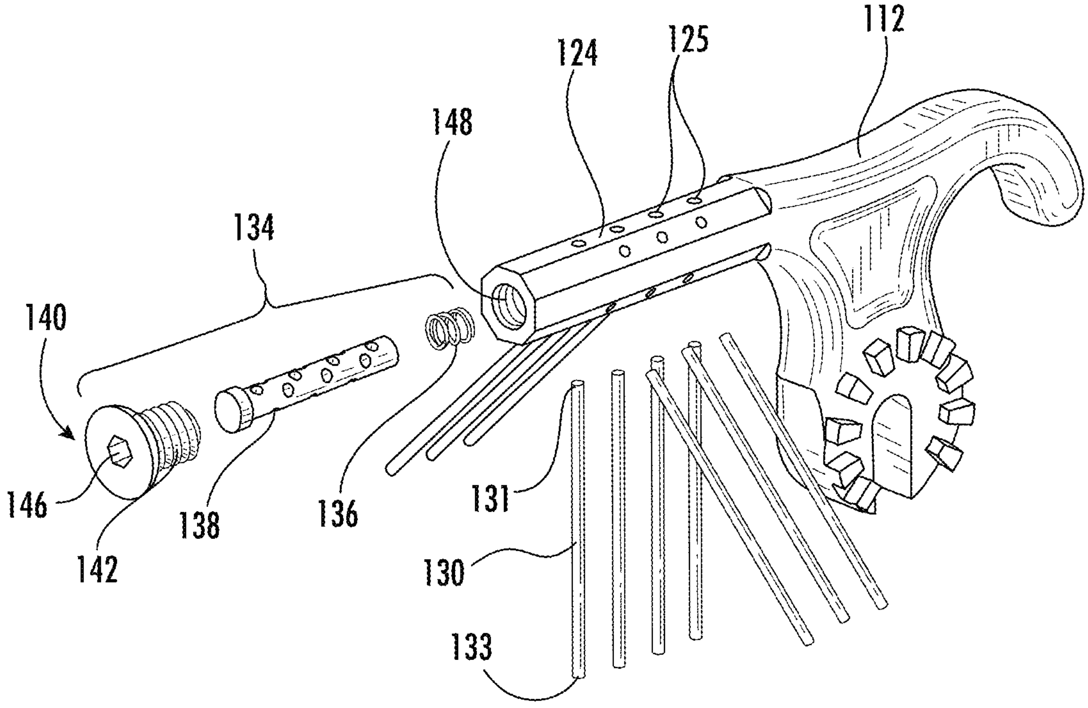
FIG. 9 is an exploded view of the probe of FIG. 7.

FIG. 9 shows the structure used to retain the fingers 130. A clamp assembly 134 comprising a compression spring 136, a rod 138, and a plug 140 is provided. The plug 140 has a threaded shank 142 and an enlarged portion which defines the head 126 of the probe shaft 124. The plug 140 further includes a hex recess 146 or other appropriate structure for engaging a driving tool. The clamp assembly 134 is installed by inserting the spring 136 into the hollow interior of the probe shaft 124, followed by the rod 138. The shank 142 of the plug 140 is then screwed into complementary threads 148 of the probe shaft 124.

Figure 10:
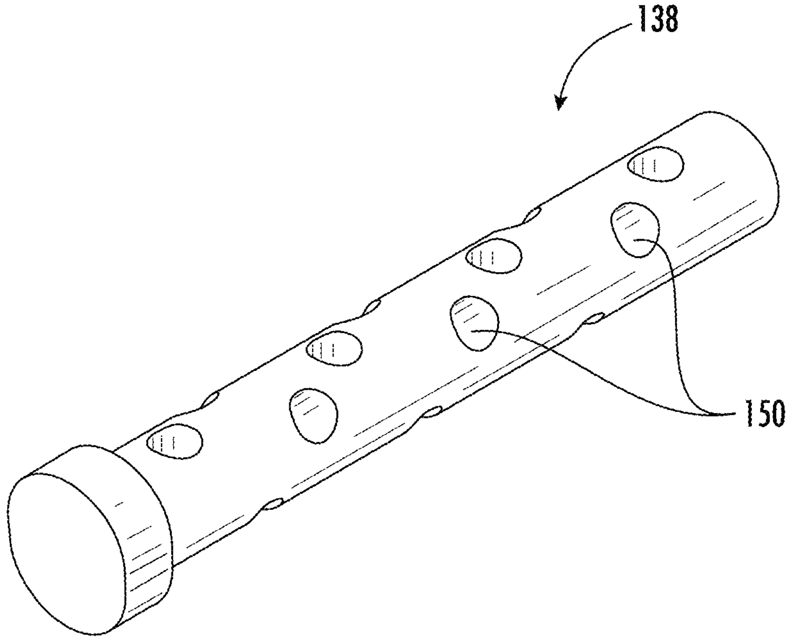
FIG. 10 is an enlarged view of a portion of FIG. 9.

As best seen in FIG. 10, the rod 138 includes a plurality of recesses 150, like small blind holes or counterbores. These are arranged in a pattern matching the pattern of the holes 125 in the probe shaft 124. To install the resilient fingers 130, the plug 140 is screwed partially into the probe shaft 124 such that the rod 138 is in a first position. In this first position, the recesses 150 align with (e.g., are coaxial to) corresponding holes 125. The inner ends 131 of the fingers 130 are then inserted through the holes 125 until they enter the recesses 150. The plug 140 is then screwed in farther, pushing the rod 138 so it further compresses the spring 136. This causes the recesses 150 to be axially offset from their corresponding holes 125 which in turn pinches or clamps each of the resilient fingers 130. The fingers 130 may be removed for replacement by reversing the process.

Figure 11:
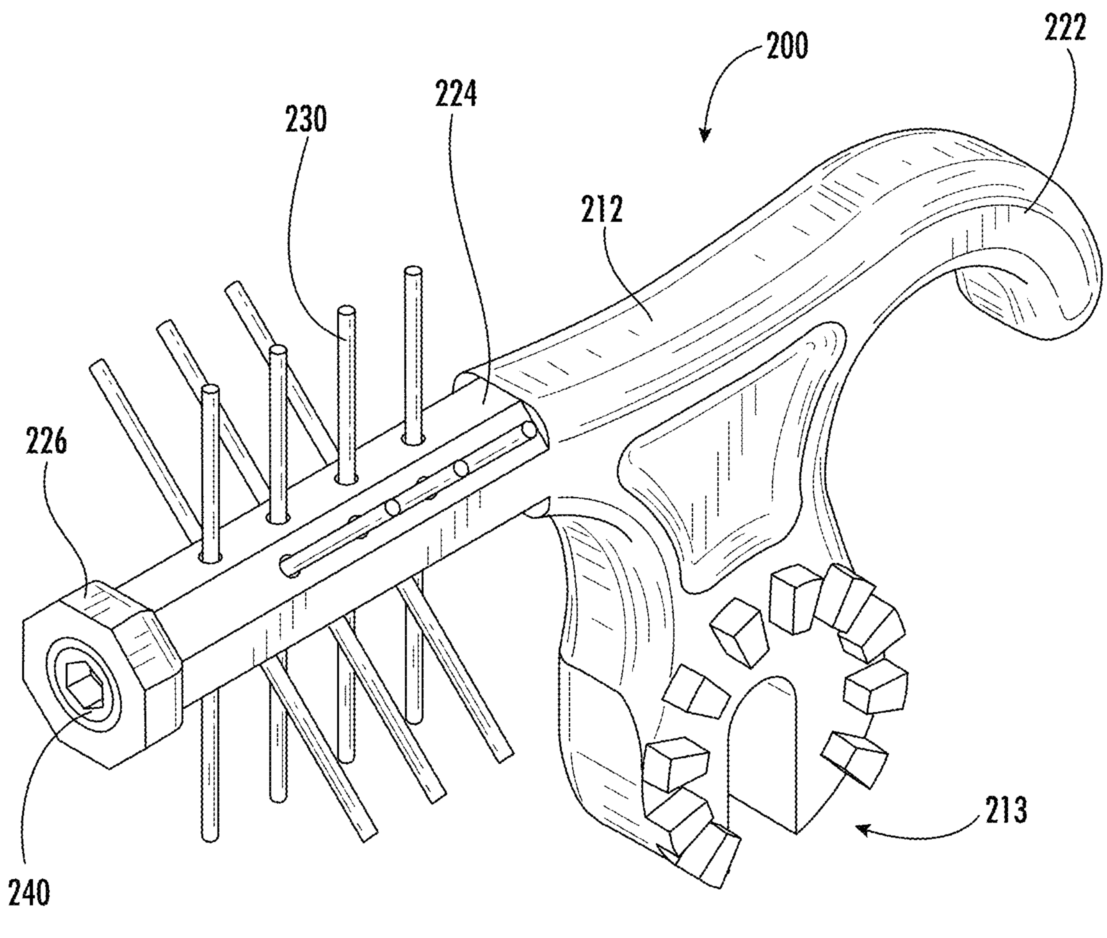
FIG. 11 is a perspective view of an alternative embodiment of a probe.
Figure 12:
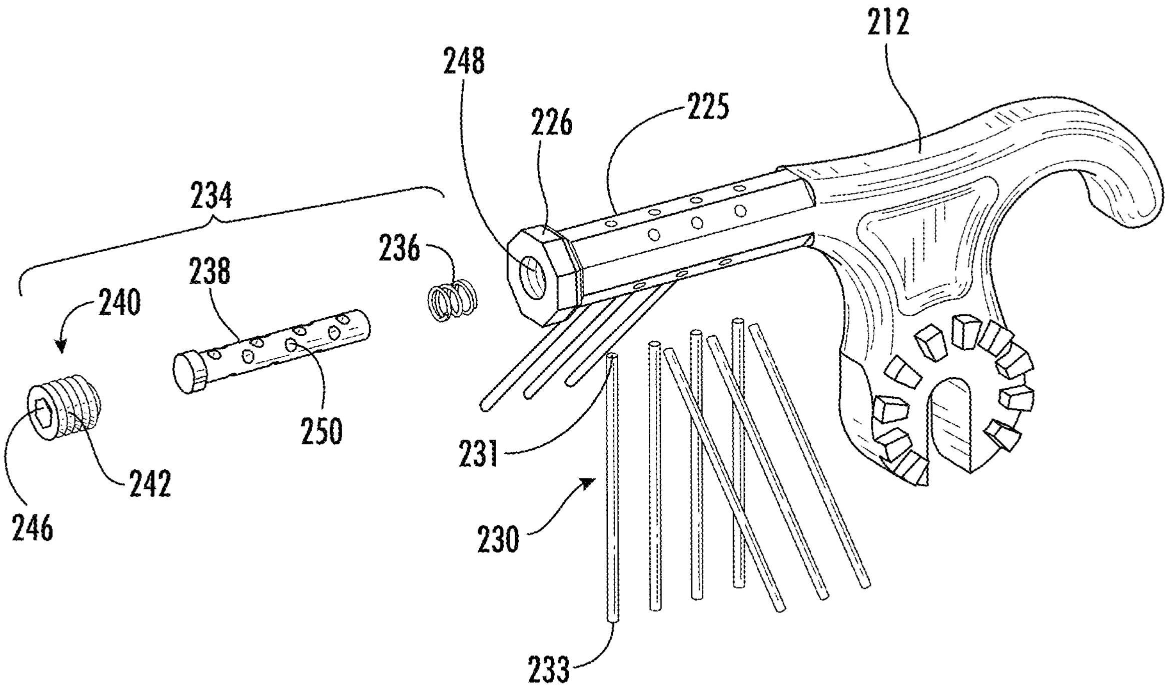
FIG. 12 is an exploded view of the probe of FIG. 11.

FIGS. 11 and 12 illustrate an alternative probe 200 which is a variation of the configuration shown in FIGS. 7-10. The probe 200 includes a unitary body 212 with a pole mount 213 at its lower end. At its upper end, the body 212 includes a hook 222. Opposite the hook 222, a probe shaft 224 extends from the body 212. A disk-like head 226 is disposed at the distal end of the shaft 224.

The probe shaft 224 is hollow and includes a plurality of holes 225. A plurality of resilient fingers 230 are mounted to the probe shaft 224. Each finger 230 has an inner end 231 and an outer end 233. The fingers 230 may be made of any material having suitable strength and resiliency, for example, natural or synthetic rubber, plastic, with or without a filler such as reinforcing fibers, or from a metal alloy. For example, they may comprise stranded metal wires (coated or uncoated).

FIG. 12 shows the structure used to retain the fingers 230. A clamp assembly 234 comprising a compression spring 236, a rod 238, and a plug 240 is provided. The plug 240 has a threaded shank 242 and a hex recess 246 or other appropriate structure for engaging a driving tool. A conventional set screw or grub screw may be used for the plug 240. The clamp assembly 234 is installed by inserting the spring 236 into the hollow interior of the probe shaft 224, followed by the rod 238. The plug 240 is then screwed into complementary threads 248 of the probe shaft 224.

The rod 238 includes a plurality of recesses 250, like small blind holes or counterbores. These are arranged in a pattern matching the pattern of the holes 225 in the probe shaft 224. To install the resilient fingers 230, the plug 240 is screwed partially into the probe shaft 224 such that the rod 238 is in a first position. In this first position, the recesses 250 align with (e.g., are coaxial to) corresponding holes 225. The inner ends 231 of the fingers 230 are then inserted through the holes 225 until they enter the recesses 250. The plug 240 is then screwed in farther, pushing the rod 238 so it further compresses the spring 236. This causes the recesses 250 to be axially offset from their corresponding holes 225 which in turn pinches or clamps each of the resilient fingers 230. The fingers 230 may be removed for replacement by reversing the process.

Referring to FIG. 1, the probe 10 (or alternatively probe 100 or probe 200) is used by inserting the shaft 24 through an opening 9 present in the structure of the fuse barrel 6, as shown by arrow "B". The fingers 30, being made of resilient material, are able to bend to allow the shaft 24 to be inserted. When the shaft 24 is inserted into the cutout the fingers 30 tend to spring back open. The fuse barrel 6 is thus engaged with the probe 10 through some combination of friction and entanglement. Stated another way, the fingers 30 require a deliberate force to insert or remove the probe 10. The fuse barrel 6 can then be lifted out (direction of arrow A) and lowered to the ground for service or replacement. The fingers 30 will keep the fuse barrel 6 on the end of the probe 10 while it is being lowered, even when the probe 10 is turned at an angle. This will keep the workers on the ground safer and keeps the fuse barrel 6 from falling.

Similarly, the probe 10 can be used to raise a fuse barrel 6 back into position on the cutout 1.

The probe described herein has advantages over prior art techniques. It will improve safety by reducing the risk of the fuse barrel 6 falling and striking a worker.

The foregoing has described a probe. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An electric utility probe configured to engage an electrical component having an eye to permit the electrical component to be lifted out and lowered to the ground, comprising:

a body having an upper portion with first and second opposing ends and a lower portion extending from the upper portion, wherein the lower portion extends from the upper portion at a location between the first and second opposing ends;

a shaft extending outwardly from the first end of the upper portion, the shaft including a plurality of holes therein; and an array of resilient fingers extending from the shaft perpendicular to an axis extending through the first and second opposing ends, wherein each of the plurality of holes is configured to receive a respective one of the array of resilient fingers therein, the resilient fingers being configured to maintain the electrical component on the shaft as the electrical component is lowered to the ground.

2. The probe of claim 1, further including a hook extending from the body opposite the shaft.

3. The probe of claim 1, further including a head disposed at a distal end of the shaft.

4. The probe of claim 3, wherein the head is disk-like.

5. The probe of claim 1, wherein the lower portion further includes a pole mount, the pole mount including a slot and a plurality of splines configured to engage complimentary splines of a line pole.

6. The probe of claim 1, wherein the shaft is removable.

7. The probe of claim 1, wherein the resilient fingers are connected to the shaft.

8. The probe of claim 7, wherein the resilient fingers are connected to the shaft by a clamp assembly.

9. An electrical utility probe configured to mount to an end of a line pole to permit an electrical component to be lifted out and lowered to the ground, comprising:

a body having an upper portion with first and second opposing ends and a lower portion extending from the upper portion, the lower portion including a pole mount to mount the body to a line pole and extends from the upper portion at a location between the first and second opposing ends;

a hollow shaft extending outwardly from the first end of the body, parallel to an axis extending through the first and second opposing ends, the hollow shaft including a plurality of holes therein, wherein the shaft, upper portion, and lower portion cooperatively form an L-shape; and an array of resilient fingers secured to the shaft, the resilient fingers being arranged in a series of rows and extend radially outwardly from the shaft, wherein each of the plurality of holes is configured to receive a respective one of the array of resilient fingers therein, the resilient fingers being configured to maintain the electrical component on the shaft as the electrical component is lowered to the ground.

10. The probe of claim 9, wherein the shaft includes a head disposed at a distal end of the hollow shaft.

11. The probe of claim 9, wherein the resilient fingers are secured to the hollow shaft by a clamp assembly.

12. The probe of claim 11, wherein the clamp assembly includes a rod positioned in an interior of the hollow shaft, the rod including a plurality of recesses, wherein each respective one of the plurality of recesses is configured to receive an end of a respective one of the array of resilient fingers therein.

13. The probe of claim 12, wherein the clamp assembly further includes a compression spring and a head, wherein the head secures the compression spring and rod in the interior of the hollow shaft.

14. An electrical utility probe configured to engage an electrical component having an eye to permit the electrical component to be lifted out and lowered to the ground, comprising:

a unitary body having an upper portion with first and second opposing ends and a lower portion adapted to mount the body to a line pole, wherein the lower portion extends from the upper portion at a location between the first and second opposing ends;

a shaft extending outwardly from the first end, the shaft including a plurality of holes therein and a head disposed at a distal end thereof; and an array of resilient fingers secured to the shaft, wherein each of the resilient fingers are secured in a respective one of the plurality of holes and extend radially outwardly from the shaft, the resilient fingers being configured to maintain the electrical component on the shaft as the electrical component is lowered to the ground.

15. The probe of claim 14, wherein a hook extends outwardly from the second end of the body.

16. The probe of claim 14, wherein the resilient fingers are secured to the shaft by a clamp assembly.

17. The probe of claim 16, wherein the clamp assembly includes:

a compression spring, a rod having a plurality of recesses, and a plug;

wherein the compression spring and rod are positioned in an interior of the shaft such that each respective one of the plurality of recesses receives an end of a respective one of the resilient fingers therein, and wherein the plug secures the compression spring and rod in the interior of the shaft.

18. A method of engaging an electrical component having an eye, the method comprising the steps of:

providing an electric utility probe including:

a body having an upper portion with first and second opposing ends and a lower portion extending from the upper portion;

a shaft extending outwardly from the first end of the upper portion, the shaft including a plurality of holes therein; and an array of resilient fingers extending from the shaft, wherein each of the plurality of holes is configured to receive a respective one of the array of resilient fingers therein; and inserting the shaft into the eye of the component such that the resilient fingers engage the eye of the component; and lifting the component out and lowering the component to the ground, the resilient fingers maintaining the component on the shaft as it is lowered to the ground.

19. The method of claim 18, further including the steps of:

connecting the body to a line pole;

using the probe to move the component from a closed position to an open position to permit the component to be lifted out and lowered.

* * * * *